United States Patent
Guldenfels et al.

(10) Patent No.: US 6,766,901 B2
(45) Date of Patent: Jul. 27, 2004

(54) SNAP-ON SIDE GUARDS (75) Inventors: Dieter Guldenfels, Pfeffingen (CH); Enrico Visconti, Camponago (IT)

(73) Assignee: Habasit AG, Reinach (CH)

( * ) Notice: Subject to any disclaimer, the term of this patent is extended or adjusted under 35 U.S.C. 154(b) by 62 days.

(21) Appl. No.: 09/909,447

(22) Filed: Jul. 19, 2001

(65) Prior Publication Data

US 2003/0015406 A1 Jan. 23, 2003

(51) Int. Cl.$^7$ ................................................. B65G 15/60
(52) U.S. Cl. ........................ 198/837; 198/850; 198/838
(58) Field of Search ............................... 198/837, 850, 198/838, 851, 852, 853, 778

(56) References Cited

U.S. PATENT DOCUMENTS

| | | | |
|---|---|---|---|
| 2,681,728 A | | 6/1954 | Boron |
| 3,554,361 A | | 1/1971 | Keough |
| 3,970,190 A | | 7/1976 | Kovats |
| 4,466,532 A | | 8/1984 | Minneman et al. |
| 4,473,151 A | | 9/1984 | Kumferman |
| 4,603,776 A | * | 8/1986 | Olsson ..................... 198/778 |
| 4,697,696 A | | 10/1987 | Howe et al. |
| 4,821,872 A | * | 4/1989 | Lapeyre ..................... 198/853 |
| 4,832,183 A | * | 5/1989 | Lapeyre ..................... 198/699 |
| 4,840,269 A | | 6/1989 | Anderson |
| 4,991,710 A | | 2/1991 | Imatomi |
| 5,137,144 A | | 8/1992 | Uehara |
| 5,165,514 A | | 11/1992 | Faulkner |
| 5,165,522 A | | 11/1992 | Uttke et al. |
| 5,183,149 A | | 2/1993 | Wierman et al. |
| 5,197,591 A | | 3/1993 | Roinestad et al. |
| 5,226,526 A | | 7/1993 | O'Brien |
| 5,346,057 A | | 9/1994 | Fisher et al. |
| 5,413,211 A | | 5/1995 | Faulkner |
| 5,490,591 A | | 2/1996 | Faulkner |
| 5,911,303 A | | 6/1999 | Malanowski |
| 5,947,262 A | | 9/1999 | Boring et al. |
| 6,073,756 A | * | 6/2000 | Damkjaer et al. ............ 198/853 |
| 6,098,792 A | | 8/2000 | Olsson |
| 6,209,716 B1 | * | 4/2001 | Bogle et al. ................. 198/852 |
| 6,216,854 B1 | | 4/2001 | Damkjaer et al. |
| 6,237,750 B1 | | 5/2001 | Damkjaer et al. |
| 6,347,699 B1 | * | 2/2002 | Ramsey ....................... 198/852 |

* cited by examiner

*Primary Examiner*—James R. Bidwell
*Assistant Examiner*—Rashmi Sharma
(74) *Attorney, Agent, or Firm*—Hodgson Russ LLP (57) ABSTRACT

An endless conveyor belt formed of plastic belt modules and capable of following a curved path. The modules include first and second module surfaces, i.e., a top, product-conveying surface and a bottom, sprocket-driven surface. An intermediate section extends across the width of each module transverse to the direction of belt travel.

A plurality of snap-on side guards are mounted in vertical openings disposed in the belt modules. Each side guard includes a central post having opposed wings extending in a forwardly and a rearwardly direction along the direction of conveyor belt travel. The wings are staggered in the lateral direction so that the forward wing of a first side guard overlaps with the rearward wing of an immediately adjacent second side guard.

7 Claims, 8 Drawing Sheets

SNAP-ON SIDE GUARDS

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

In many industrial applications, conveyor belts are used to carry products along paths including curved segments. Belts capable of flexing sidewise to follow curved paths are referred to as side-flexing, turn, or radius belts. As a radius belt negotiates a turn, the belt must be able to fan out because the edge of the belt at the outside of the turn follows a longer path than the edge at the inside of the turn. In order to fan out, a modular plastic radius belt typically has provisions that allow it to collapse at the inside of a turn or to spread out at the outside of the turn.

Apertures slotted in the direction of travel of the belt are commonly provided in the link ends on at least one side of the modules to facilitate the collapsing and spreading of the belt.

It has been known to provide radius belts with side guards to prevent transported articles from falling off of the conveyor belt. The conventional arrangement for attaching the side guards to radius belts has been to hold the side guard between link ends by attachment of one end of the side guard to one of the link ends and by attaching the opposite end of the side guard to the pivot rod adjacent to the link end. This solution has the disadvantage that it may significantly hinder the collapsing of the modules in the curve.

What is needed is a snap-on side guard for a modular radius conveyor belt that does not interfere with the collapsing of the modules and that can be easily assembled and disassembled for cleaning.

SUMMARY OF THE INVENTION

The present invention meets the above-described need by providing an endless conveyor belt formed of plastic belt modules and capable of following a curved path. The modules include first and second module surfaces, i.e., a top, product-conveying surface and a bottom, sprocket-driven surface. An intermediate section extends across the width of each module transverse to the direction of belt travel.

A plurality of snap-on side guards are mounted in vertical openings disposed in the belt modules. Each side guard includes a central post having opposed wings extending in a forwardly and a rearwardly direction along the direction of conveyor belt travel. The wings are staggered in the lateral direction so that the forward wing of a first side guard overlaps with the rearward wing of an immediately adjacent second side guard.

Accordingly, the side guards do not interfere with the collapsing of the belt around turns because they are not attached to the pivot rods. Also, because the wings on adjacent modules are offset laterally they are capable of moving relative to one another without interference.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
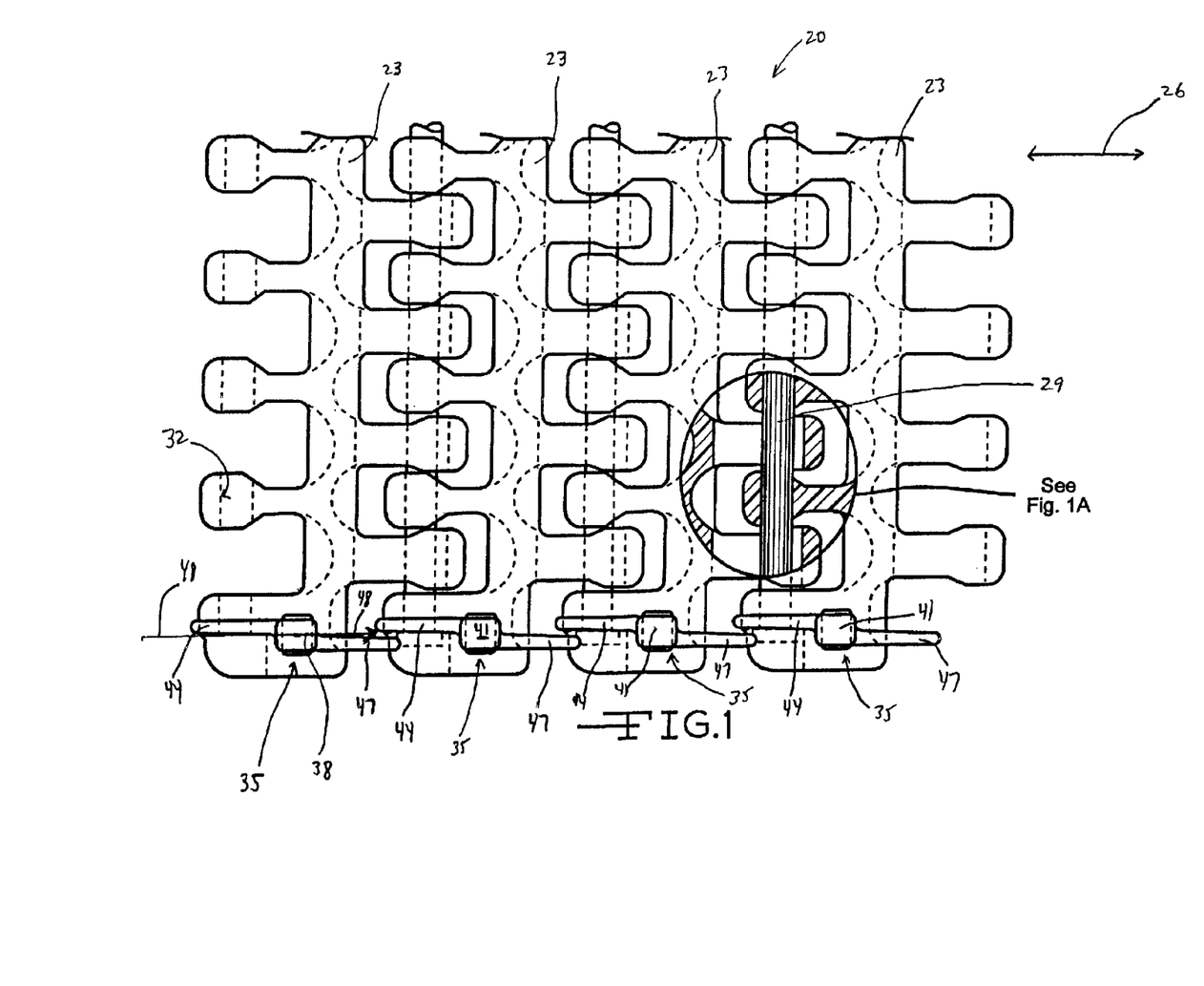
FIG. 1 is a top plan view of a radius conveyor belt with the snap-on side guards of the present invention and with a portion of the belt modules cutaway.
Figure 1A:
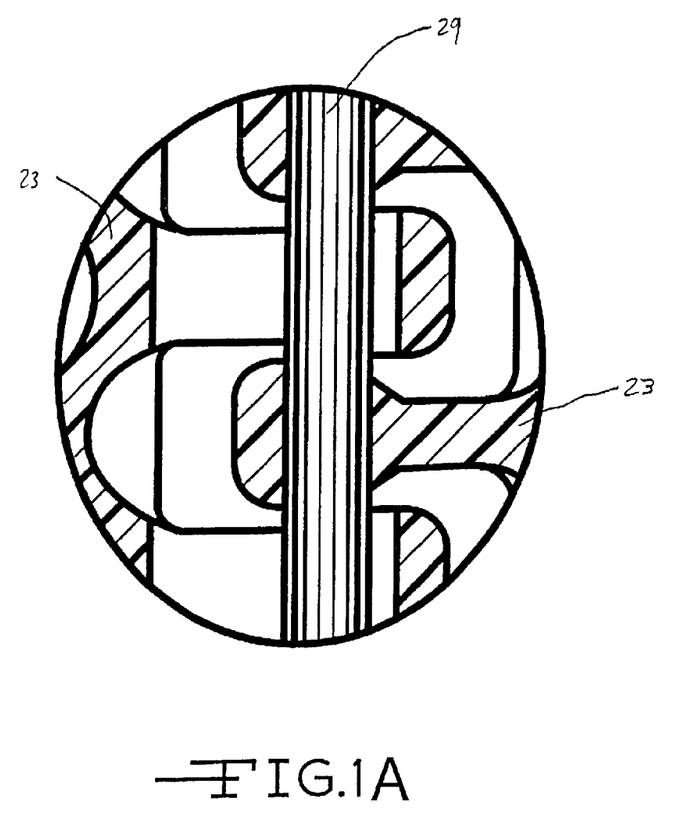
FIG. 1A is a detailed top plan view of the cutaway portion shown in FIG. 1.

Referring now to FIGS. 1–8 and initially to FIGS. 1 and 1A, a portion of a modular belt 20 of the present invention is shown. The portion of the modular belt 20 shown is formed from molded plastic modules 23. For reference, the direction of belt travel is indicated by arrow 26. A plurality of pivot rods 29 connect adjacent belt modules 23 by passing through openings 32 in the modules 23 disposed transverse to the direction of belt travel. As known to those of skill in the art, the radius belt 20 of the present invention also includes slots 33 (FIG. 2) that are elongated in the direction of belt travel to facilitate the collapsing and expanding required for radius belts when negotiating curves.

In FIG. 1, a plurality of snap-on side guards 35 are mounted in vertical openings 38 disposed in the belt modules 23. Each side guard 35 includes a central post 41 having opposed wings 44, 47 extending in a forwardly and a rearwardly direction along the direction of conveyor belt travel. With respect to a longitudinal axis 48 disposed through the center of the central post 41 oriented along the direction of belt travel, the wings 44, 47 are staggered or offset in the lateral direction so that the forward wing of a first side guard 35 overlaps with the rearward wing of an immediately adjacent second side guard 35.

Figure 2:
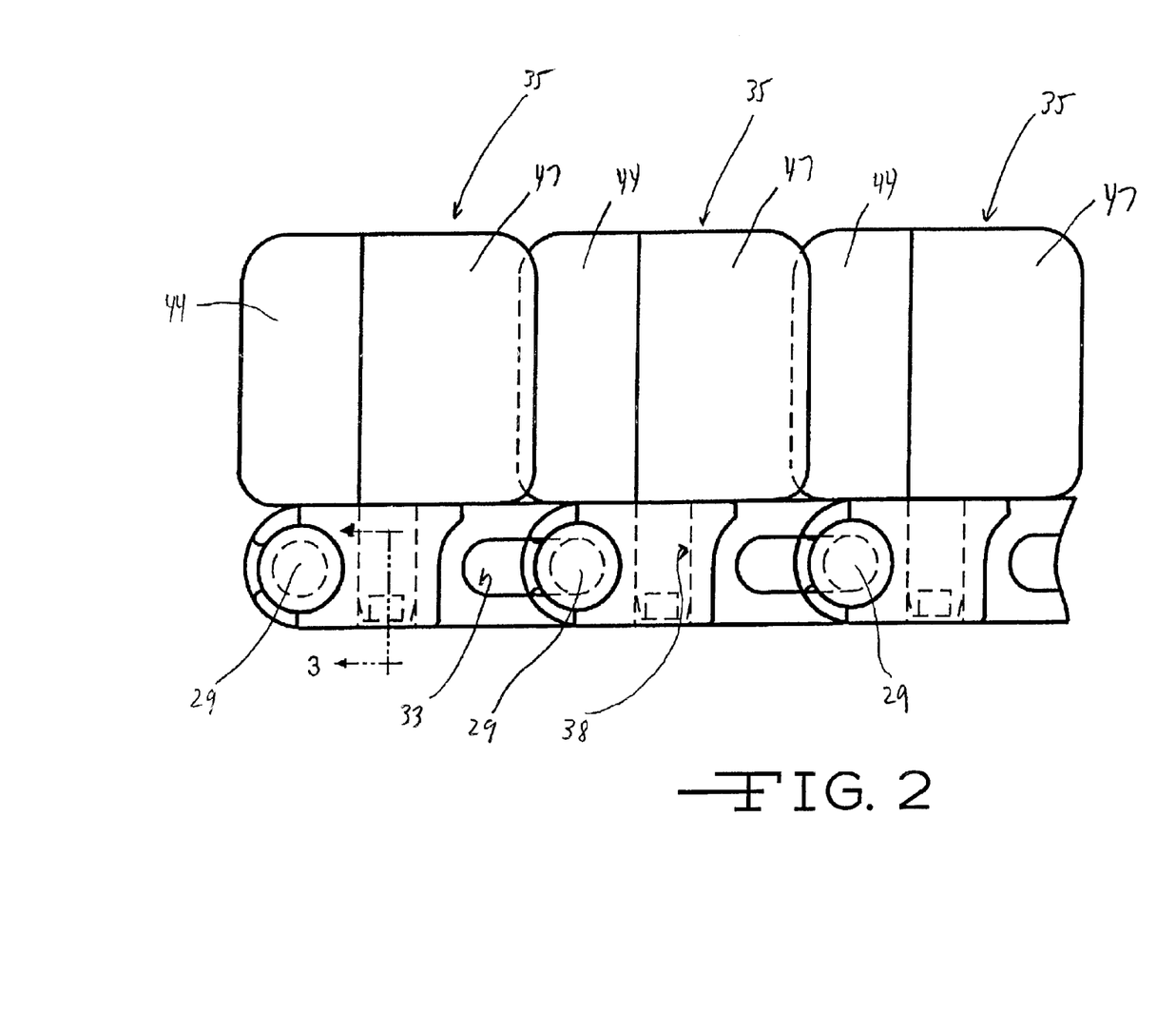
FIG. 2 is a partial side elevational view of the belt and snap-on side guards shown in FIG. 1.
Figure 8:
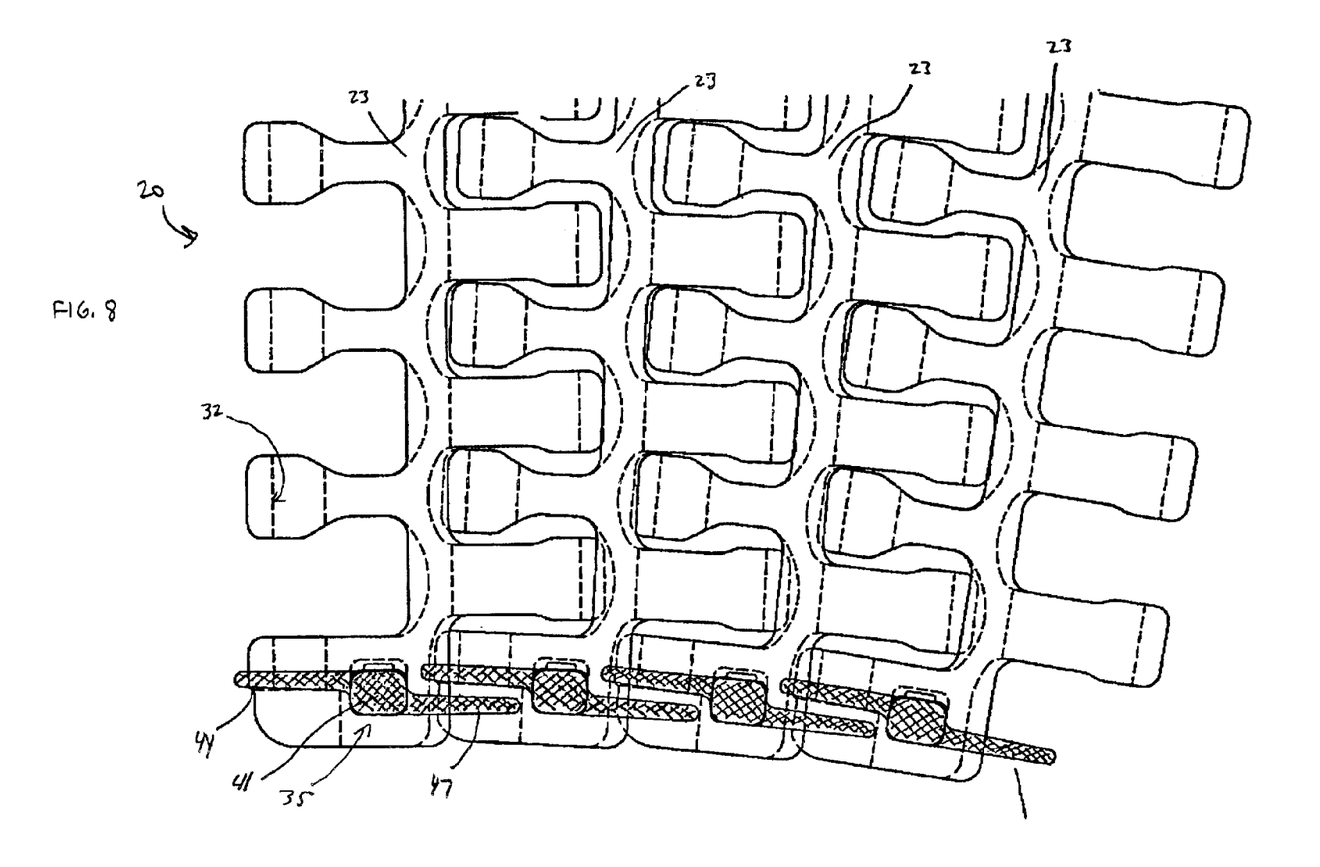
FIG. 8 is a top plan view of a radius conveyor belt, which is provided with the snap-on side guards of the present invention, as it rounds a curve.

As shown in FIG. 2, the side guards 35 are disposed inside the vertical openings 38 in the belt modules 23. Accordingly, the side guards 35 are mounted in the modules 23 and are independent of the pivot rods 29. The side guards 35 do not interfere with the collapsing of the belt 20 because they are not attached to the pivot rods 29 as best shown in FIG. 8. Also, because the wings 44 and 47 on adjacent modules 23 are offset laterally they are capable of moving relative to one another without interference.

Figure 3:
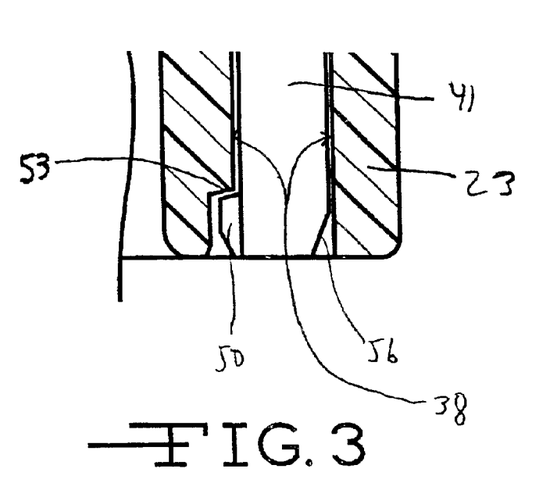
FIG. 3 is a sectional view taken along lines 3—3 of FIG. 2.

In FIG. 3, the side guard 35 is mounted to the link module 23 by means of a downwardly extending hook-shaped projection 50 which snaps into a recess inside the opening 38. The opening 38 is provided toward the edge of the belt module 23 (the position of the side guards relative to the belt is best shown in FIG. 1). The opening 38 has a ledge 53 that engages with the top surface of the projection 50 to secure the side guard 35 to the module 23. A beveled back wall 56 disposed on the side guard 35 on a side opposite from the hook-shaped projection 50 allows easy insertion of post 41 into the opening 38. The plastic wall of module 23 is capable of flexing to allow the hook-shaped projection 50 to be moved into locked position.

Figure 4:
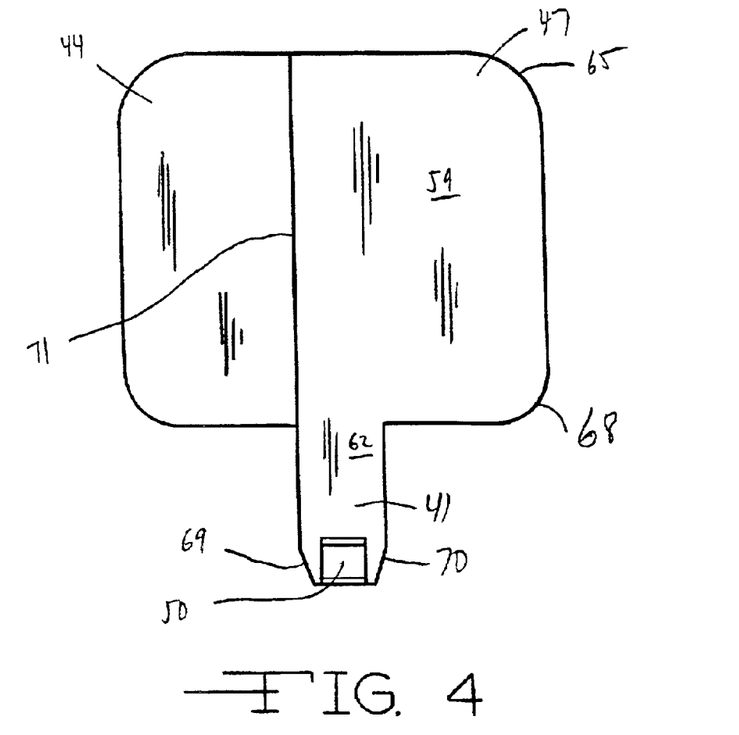
FIG. 4 is a front elevational view of a snap-on side guard of the present invention.
Figure 5:
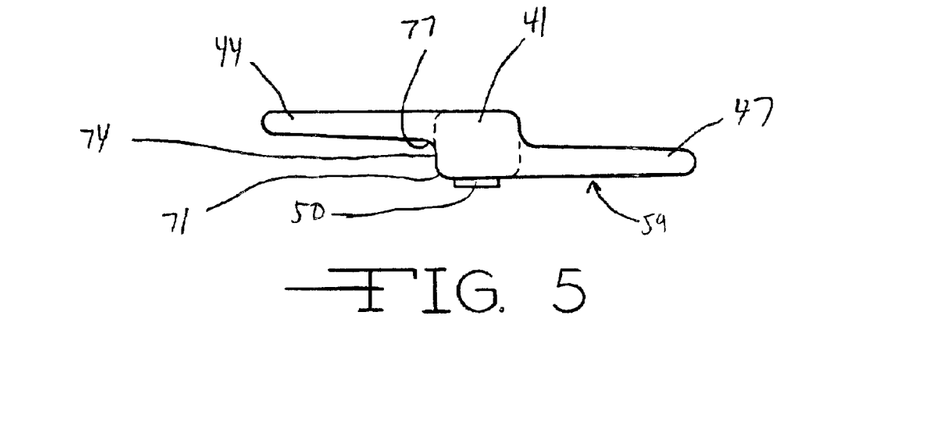
FIG. 5 is a top plan view of the snap-on side guard of FIG. 4.

Referring to FIGS. 4 and 5, the offset between the wings 44 and 47 is shown in greater detail. In FIG. 4, the wing 47 is shown with relation to the central post 41. A front face 59 of wing 47 is coplanar with a front face 62 of the central post 41. The two surfaces form a substantially rectangular face having rounded edges 65 and 68. At the bottom of the rectangular surface where the wing 47 terminates, the central post 41 continues downward until it terminates just below the projection 50. As shown with respect to the orientation of FIG. 4, the bottom left and right sides 69, 70 of the central post 41 may also be beveled inward for easier assembly. The left side of the face formed by the wing 47 and the central post 41 terminates along a curved edge 71 that connects to a side face 74. The side face extends backward until it terminates in a curved surface 77 that merges with wing 44.

Figure 6:
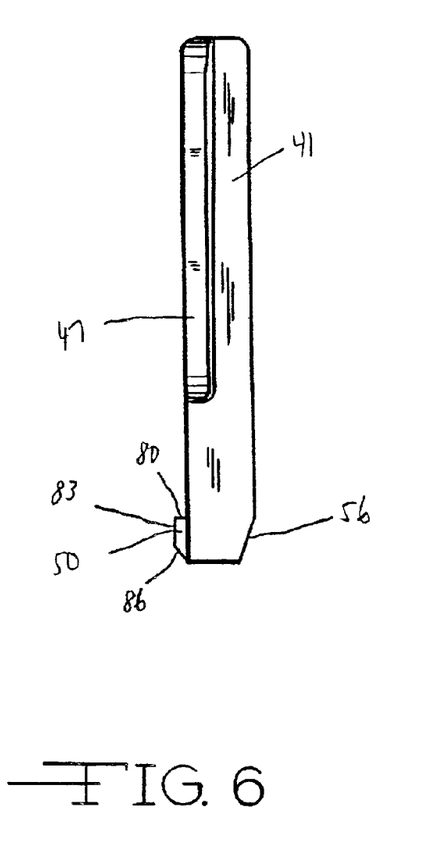
FIG. 6 is a side elevational view of the snap-on side guard of FIG. 4.
Figure 7:
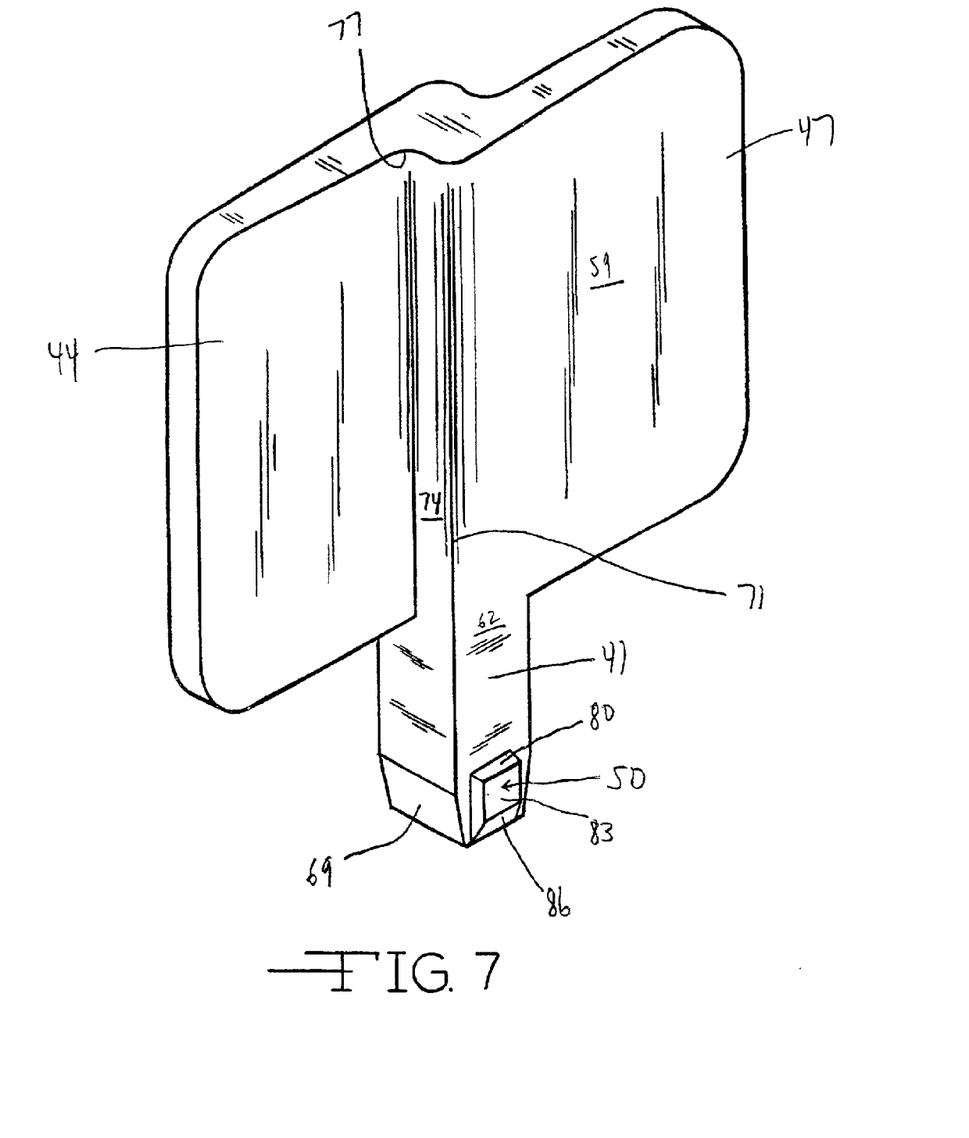
FIG. 7 is a perspective view of the snap-on side guard of FIG. 4.

Turning to FIGS. 6–7, the projection 50 may be formed out of multiple surfaces. As shown, a top surface 80 extends substantially perpendicular to the front face 62 of the central post 41. The surface 80 terminates at a surface 83 that is substantially parallel to the front face 62. The surface 83 extends downward until it terminates in an angled surface 86 that extends between surface 83 and the post 41.

While the example shown includes a projection 50 on the central post 41 and a cooperating recess and ledge 53 disposed on the belt module 23, it will be obvious to those of ordinary skill in the art that other interlocking arrangements between the central post 41 and the inside of the opening 38 would also be suitable. For example, the post 41 could be provided with a recess that engages with a projection inside the opening. As an alternative, the side guard could have a recess for engaging with a projection disposed on the top surface of the module.

While the invention has been described in connection with one embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A modular belt system, comprising:

a plurality of belt modules having a product conveying surface, a bottom surface disposed opposite from the product conveying surface and an opening disposed substantially perpendicular to the product conveying surface, the opening extending from the product conveying surface to the bottom surface, the opening being defined by a first inner wall that is substantially straight and a second inner wall having a straight portion extending from the product conveying surface to a point between the product conveying surface and the bottom surface, the second inner wall having a recessed portion forming a ledge, the opening having a larger diameter at the bottom surface than at the product conveying surface; and a side guard having a central post with a projection disposed thereon, the central post capable of sliding substantially perpendicular into the opening such that the projection engages with the recessed portion in the belt module.

2. A modular belt system, comprising: a plurality of belt modules having a product conveying surface and an opening disposed substantially perpendicular to the product conveying surface, the module having a recessed portion defined therein adjacent to the opening such that a ledge is formed adjacent to the opening; and a side guard having a central post with a projection disposed theteon, the central post capable of sliding into the opening such that the projection engages with the recessed portion in the belt module wherein the central post has a back wall that is beveled inward and disposed opposite from the projection.

3. The modular belt system of claim 2, wherein the plurality of belt modules comprises an intermediate section having a sinusoidal shape and a plurality of link ends extending from the intermediate section in opposite directions such that one of the plurality of belt modules is capable of being intercalated with an adjacent belt module by a pivot rod, the adjacent belt modules forming a radius belt capable of collapsing around a curved conveying path.

4. The modular belt system of claim 2, wherein the side guard has a first wing extending from the central post in a first direction.

5. The modular belt system of claim 4, wherein the side guard has a second wing extending from the central post in a second direction opposite the first direction.

6. The modular belt system of claim 5, wherein the first wing and the second wing are offset laterally with respect to a longitudinal axis defined through the center of the central post.

7. The modular belt system of claim 2, wherein a front surface of the central post is coplanar with the second wing.

* * * * *